United States Patent [19]

Kirk

[11] 4,133,541
[45] Jan. 9, 1979

[54] SEAL
[75] Inventor: Robley G. Kirk, Easton, Pa.
[73] Assignee: Ingersoll-Rand Company, Woodcliff Lake, N.J.
[21] Appl. No.: 885,854
[22] Filed: Mar. 13, 1978
[51] Int. Cl.² .............................................. F16J 15/34
[52] U.S. Cl. ...................................... 277/65; 277/27; 308/160
[58] Field of Search ................... 308/160; 277/65, 81, 277/27, 25

[56] References Cited
U.S. PATENT DOCUMENTS 3,675,933  11/1972  Nappe ..................................... 277/65
3,756,673  9/1973   Strub ...................................... 277/27
3,811,687  5/1974   Honold .................................. 277/65
3,937,477  2/1976   Gyory .................................... 277/65
4,071,253  1/1978   Heinen ................................... 277/65

Primary Examiner—Robert I. Smith
Attorney, Agent, or Firm—Bernard J. Murphy

[57] ABSTRACT

According to embodiments shown, the novel oil seals employ tilting pads, such as are used in bearing practices, to avoid or reduce the cross-coupled stiffness of cylindrical, hydrodynamic bearings. The tilting pads and cooperative grooved, sealing lands are arranged to effect a maximum sealing within a minimum axial length.

10 Claims, 7 Drawing Figures

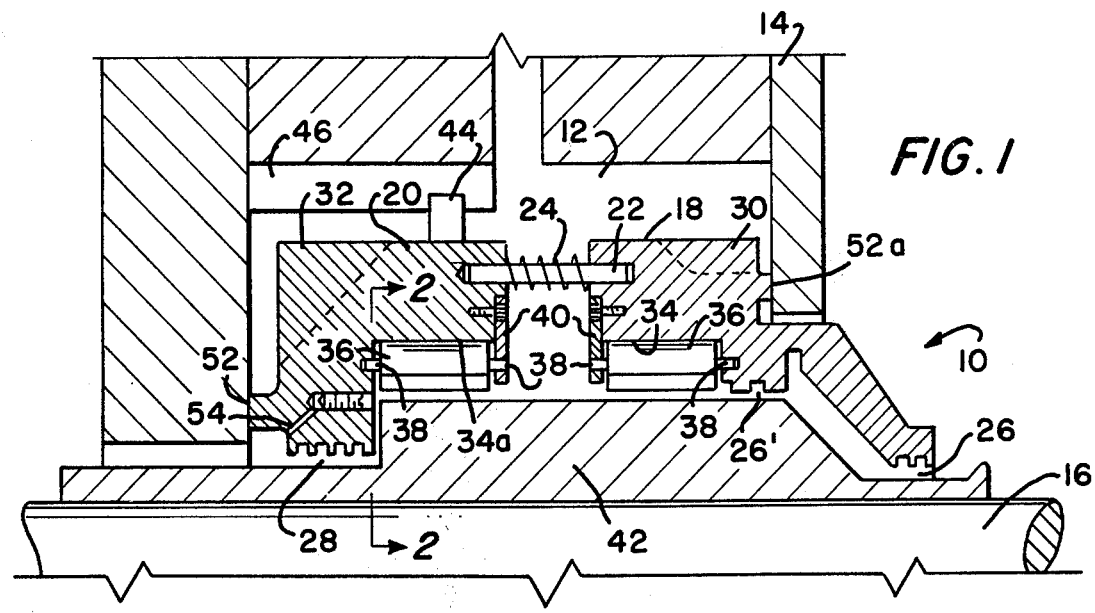
FIG. 1
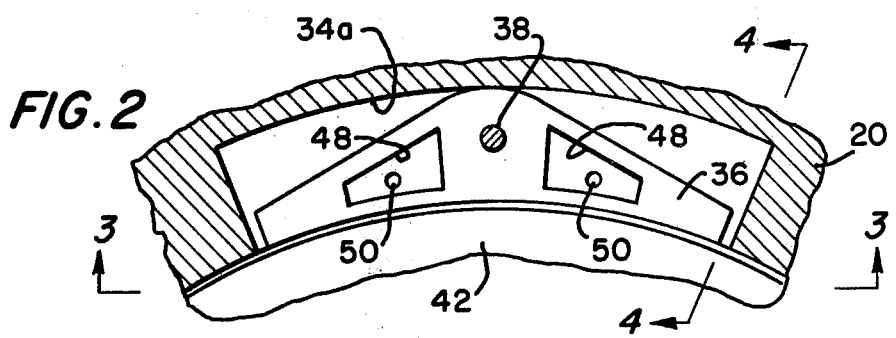
FIG. 2
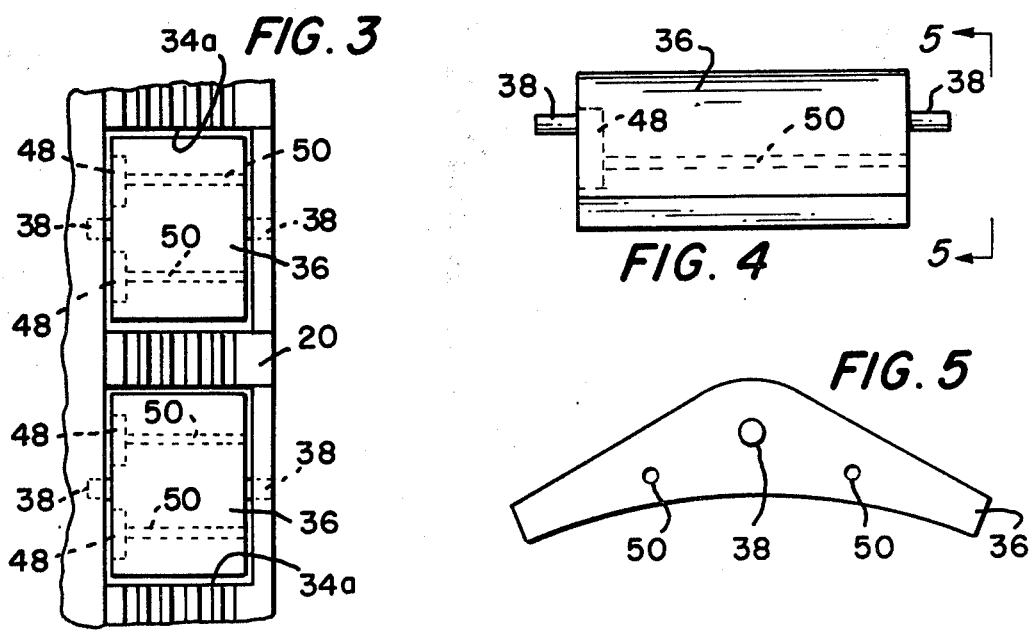
FIG. 3
FIG. 4
FIG. 5

SEAL

This invention pertains to oil seals, and in particular relates to improvements in turbo-machinery oil seal designs which, in turn, improve the overall response and dynamic stability of turbo-machines.

The increased speeds have led to designs in turbo-machines that have maximum continuous speed much in excess of twice the first, shaft-bending, critical speeds. The use of standard, cylindrical, sleeve-type oil seals, in such high speed turbo-machines, has led to occurrence of a shaft whip instability of the rotor wherein the driving mechanism for such instability has been the oil seals themselves.

The use of a tilting pad bearing is known to substantially reduce or eliminate the detrimental cross-coupled stiffness of cylindrical, hydrodynamic bearings. It is the purpose of this invention to use this much improved load generating capability to bring a grooved cylindrical sealing area into a more concentric relation to the shaft which it surrounds.

It is an object of this invention to provide a positive direct stiffness and damping to reduce the eccentricity of a grooved oil seal to eliminate the potential of shaft-whip instability when operating in excess of twice the turbo-machine first critical speed. The novel seal relies upon a centrifugal pumping action to counter the loss in sealing which occurs when the sealing area is grooved.

It is also an object of this invention to set forth, for use in turbo-machinery having a housing, and a shaft journaled in said housing, said housing having a cavity formed therein in envelopment of said shaft, an improved oil seal for use in said cavity for sealing said shaft, comprising at least one seal body having a bore formed therein to receive said shaft axially therethrough; a plurality of bearing pads coupled to said body about said bore; and means supporting said pads only at axial ends thereof to facilitate (a) a tilting of said pads relative to said bore, and (b) a positive, direct centering of said seal body relative to any such shaft axially received through said bore.

Further objects of this invention, as well as the novel features thereof, will become more apparent by reference to the following description taken in conjunction with the accompanying Figures in which:

FIG. 1 is an upper half of an axial cross-sectional view of an embodiment of the novel seal;

FIG. 2 is a view taken along section 2—2 of FIG. 1;

FIG. 3 is a cross-sectional view taken along section 3—3 of FIG. 2;

FIG. 4 is an end view of one of the tilting pads taken along section 4—4 of FIG. 2;

FIG. 5 is a side view of the tilting pad of FIG. 4, taken along section 5—5 of FIG. 4;

Figure 7:
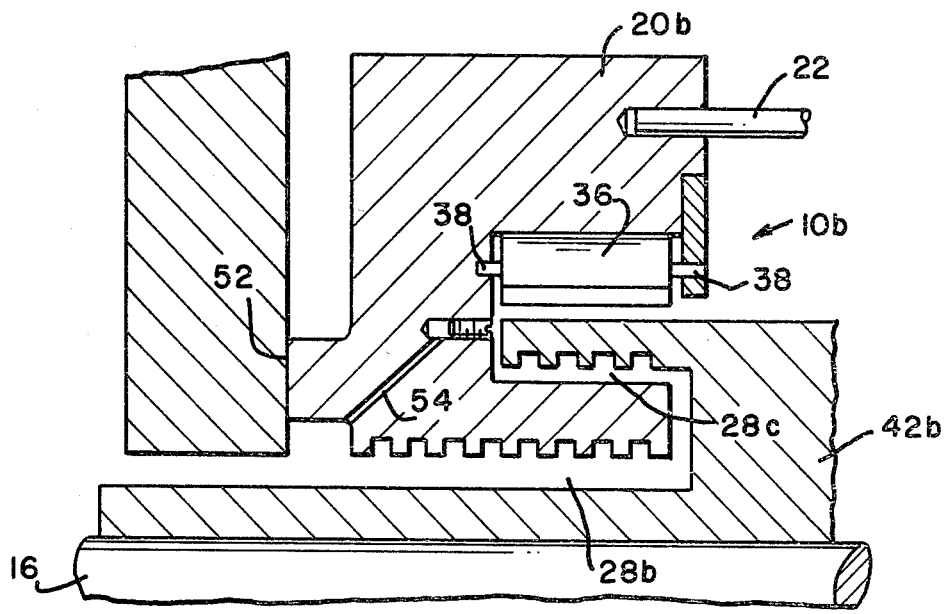
FIG. 7 is a partial cross-sectional view, like that of FIG. 6, of a further alternative embodiment of the novel seal.

As shown in the Figures, a first embodiment 10 of the novel seal is disposed within a cavity 12 formed in a housing 14. The housing 14 and seal embodiment 10 envelop a shaft 16 journaled in the housing. Seal embodiment 10 comprises a pair of inner and outer seal elements 18 and 20, respectively, which are piloted together. Seal elements 18 and 20 have axial bores formed therein, in alignment, which receive a pilot pin 22 loosely therewithin. A compression spring 24 is carried by pin 22 to urge elements 18 and 20 relatively, axially apart. Element 18 has circumferentially grooved lands 26 and 26' at an end thereof and inboard thereof; and element 20 has a circumferentially grooved land 28 at an end thereof. Elements 18 and 20 also have end cooling fins 30 and 32.

Each of the seal elements 18 and 20 has a plurality of recesses 34 or 34a in which tilting pads 36 are supported. Each pad has axially-directed pivot pins 38 which are received in pivot-pin bores. A pivot support disc 40 is replaceably fixed to each of the seal elements 18 and 20; discs 40 have said pivot-pin bores formed therein and aligned, axially, with like pivot-pin bores formed in annular sides of recesses 34 and 34a.

Lands 26 and 28 form a sealing interface with a shaft sleeve 42, and an anti-rotation pin 44 extends radially from seal element 20, and engages an axially-extending slot 46 formed in housing 14. The low-pressure sides of the pads 36 have hydrostatic recesses 48 formed therein which communicate, via throughgoing channels 50, with the high-pressure sides (of the pads 36).

The multiplicity of tilting pads 36 provide a positive direct centering capability. The outer and inner seal elements 20 and 18 have a lapped ring area 52 and 52a in contact with the seal housing inner walls to provide a positive sealing capability and hence a restraint on the otherwise free-floating seal elements 18 and 20.

The free-floating tilting pads 36 have a preload in relation to the rotating shaft 16 and additionally have an offset of 50% to permit load capacity for anit-rotation such that the seal embodiment 10 can be used in either end of the turbo-machine. The running clearances at the pivot of the pads 36 are held to close tolerance to ensure a positive load capacity.

Centrifugal pumping areas, at lands 26 and 28, are provided for both inner and outer seal elements 18 and 20 to counter the decreased sealing capability arisen from a multiplicity of circumferential grooves in the cylindrical seal surface to substantially eliminate the hydrodynamic load capacity of both inner and outer cylindrical seal areas.

The lapped ring areas 52 and 52a are so positioned to provide for a predetermined frictional restraint on the sliding, floating seal elements.

A special optional feature of the invention will provide for a plurality of closeable drain holes 54 to permit high volume flow to cool the seal embodiment 10 when operating on test with reduced suction pressure. This eliminates the need for modified seal elements during shop tests of the turbo-machine.

Alternate embodiments 10a, 10b, of the invention, (FIG. 6, 7) provide for a seal with high pressure capability with much reduced axial length. This permits an increase in staging over current designs without substantially lowering the placement of the turbo-machine's first and second critical speeds. This gain in staging is taken at a loss in seal horsepower absorbed due to the viscous drag on the radial flow passages. The gain in staging is considered to outweigh the loss in horsepower absorbed by the seal. The radial flow passages are so designed such that a minimum loss will be obtained.

Figure 6:
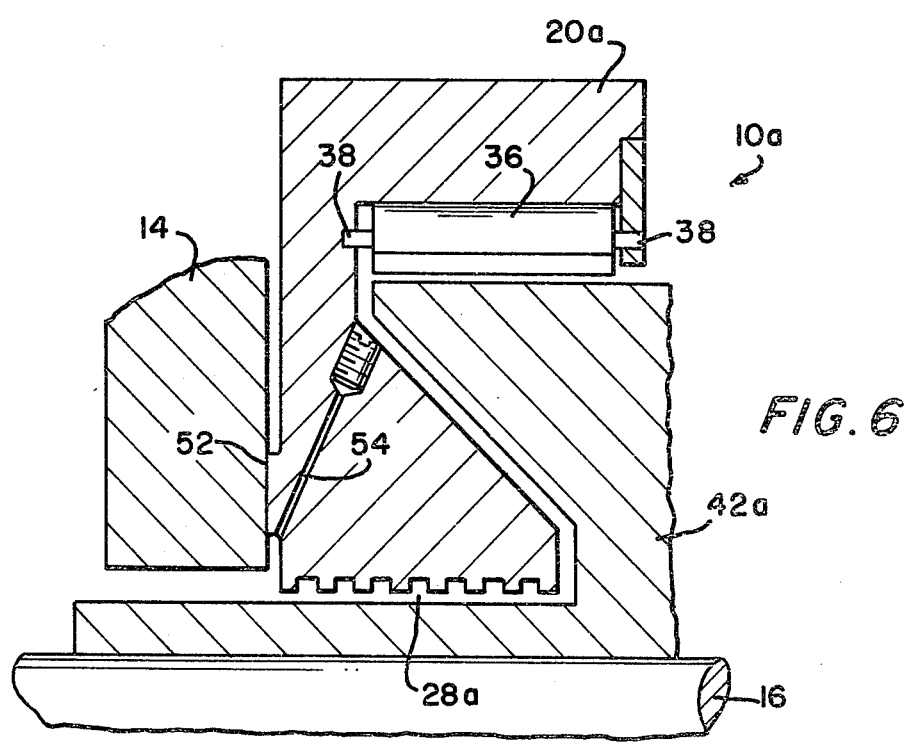
FIG. 6 is a partial cross-sectional view similar to that of FIG. 1 of an alternative embodiment of the novel seal.

In the FIG. 6 embodiment 10a, the seal element 20a carries the sealing land 28a back under the tilting pads(s) 36. Correspondingly, the shaft sleeve 42a is modified to accommodate element 20a. By this arrangement, then, as much sealing as the FIG. 1 embodiment 10 (or more) is effected in less axial length (than that required by the FIG. 1 embodiment 10).

The FIG. 7 embodiment 10b carries the axial-length conservation even further. Here the seal element 20b again carries the sealing land 28b fully under the circumferential area occupied by the tilting pads 36. In addition, an annular void is provided in which to receive an ancillary, grooved, sealing land 28c formed on shaft sleeve 42b.

While I have described my invention in connection with specific embodiments thereof, it is to be clearly understood that this is done only by way of example, and not as a limitation to the scope of my invention as set forth in the objects thereof and in the appended claims.

I claim:

1. For use in turbo-machinery having a housing, and a shaft journaled in said housing, said housing having a cavity formed therein in envelopment of said shaft, an improved oil seal for use in said cavity for sealing said shaft, comprising:
    at least one seal body having a bore formed therein to receive said shaft axially therethrough;
    a plurality of bearing pads coupled to said body about said bore; and
    means supporting said pads only at axial ends thereof to facilitate (a) a tilting of said pads relative to said bore, and (b) a positive, direct centering of said seal body relative to any such shaft axially received through said bore.

2. An improved oil seal, according to claim 1, wherein:
    said body has a land surface circumscribing said bore; and
    said land surface has a plurality of circumferential grooves formed therein.

3. An improved oil seal, according to claim 2, wherein:
    said bore has a plurality of inside diameters;
    said land surface defines a first of said diameters; and
    said plurality of bearing pads are supported in adjacency to a second of said diameters.

4. An improved oil seal, according to claim 3, wherein:
    said second diameter is greater than said first diameter.

5. An improved oil seal, according to claim 1, wherein:
    each of said pads of said plurality thereof has a high-pressure side at one axial end thereof and a low-pressure side at the opposite axial end, and means defining a hydrostatic recess formed in one of said sides.

6. An improved oil seal, according to claim 5, further including:
    means effecting a fluid communication between said high-pressure and low-pressure sides.

7. An improved oil seal, according to claim 1, further including:
    a second seal body having a bore formed therethrough;
    said bore of said second seal body being axially aligned with said bore of said one seal body; and
    means axially piloting said seal bodies on each other.

8. An improved oil seal, according to claim 7, wherein:
    said piloting means includes means urging said seal bodies apart.

9. An improved oil seal, according to claim 1, wherein:
    said seal body has first and second axial ends; and further including
    passageway means formed in said body from a given location intermediate said first and second axial ends to another location at least in adjacency to one of said axial ends for providing a low-pressure fluid bleed path therethrough.

10. An improved oil seal, according to claim 9, further including:
    metering means adjustably fixed in said passageway means for selectively altering or metering fluid bleed therethrough.

* * * * *